United States Patent [19]

Gustafsson et al.

[11] Patent Number: 5,007,295
[45] Date of Patent: Apr. 16, 1991

[54] MAGNETOELASTIC FORCE TRANSDUCER

[75] Inventors: Pär Gustafsson; Jarl Sobel; Lars Ornholmer, all of Västerås, Sweden

[73] Assignee: Asea Brown Boveri AB, Västerås, Sweden

[21] Appl. No.: 460,515

[22] Filed: Jan. 3, 1990

[51] Int. Cl.⁵ .................................................. G01L 1/12
[52] U.S. Cl. ................................... 73/862.69; 336/20
[58] Field of Search ............... 73/862.69, 779, DIG. 2; 336/20

[56] References Cited

U.S. PATENT DOCUMENTS

| | | | |
|---|---|---|---|
| 1,906,551 | 5/1933 | DeForest | 73/DIG. 2 |
| 2,557,393 | 6/1951 | Rifenbergh | 73/DIG. 2 |
| 3,122,927 | 3/1964 | Chass | 336/20 X |
| 4,802,368 | 2/1989 | Nordvall | 73/862.69 |

FOREIGN PATENT DOCUMENTS

| | | | |
|---|---|---|---|
| 0662828 | 5/1979 | U.S.S.R. | 73/862.69 |
| 1384968 | 3/1988 | U.S.S.R. | 73/862.69 |

Primary Examiner—Charles A. Ruehl
Attorney, Agent, or Firm—Watson, Cole, Grindle & Watson

[57] ABSTRACT

A magnetoelastic force transducer according to the invention comprises two closed magnetic circuits. The transducer is constructed in such a way that the reluctance in one of the magnetic circuits will be changed when the transducer is subjected to a force as a result of changes in the magnetic permeability caused by magnetostriction. The second magnetic circuit is formed so as to have an essentially unchanged reluctance when the transducer is loaded and is used to compensate for those changes in the permeability of the material arising for reasons other than magnetostriction.

8 Claims, 1 Drawing Sheet

MAGNETOELASTIC FORCE TRANSDUCER

Technical field

The present invention relates to a transducer for primarily measuring tensile and/or compressive force. When only compressive force is to be measured, the transducer need not be fixedly mounted on the force-absorbing base. The transducer may also be designed so as to obtain a combined measurement of tensile/compressive force and torque, for example for measurement on a drilling head.

BACKGROUND ART

Utilizing the magnetoelastic effect of a ferromagnetic material for electrically measuring mechanical forces is an idea that arose more than 50 years ago. However, it was outcompeted by strain gauges, except in special applications in heavy industrial environments where the high signal power and the good mechanical properties of the transducer have made the magnetoelastic transducer practically universally prevailing.

These properties, in combination with the possibility of mass-producing simple and inexpensive but still sufficiently accurate magnetoelastic transducers, has opened up a new niche for the magnetoelastic technique.

U.S. Pat. No. 1,906,551 entitled "Magnetic testing method and means" describes several basic principles of force measurement utilizing the magnetoelastic effect. It describes, inter alia, the use of separate excitation and measuring windings as well as the use of an unloaded measuring body applied to a differential measurement.

The transducer described in U.S. 1,906,551 is a relatively complicated design which is not conceivable for use in simple and robust applications. In addition, the design as such has a number of fundamental deficiencies. For a differential measurement to provide good stability with the aid of an unloaded measuring body, it is required that the measuring body should be as equal to the force-measuring body as possible, both as regards the measuring bodies per se, i.e. material and geometry, and as regards the surrounding magnetic circuits. To obtain good conformity with the temperature, an additional requirement is that there should be very good thermal contact between the two measuring bodies.

U.S. Pat. No. 1,906,551 also describes a pressure measuring device comprising a transducer for tension and/or compression. The purpose of this is to generate a tensile stress in one measuring zone in order to obtain a tension signal with inverse sensitivity to the signal from the other measuring zone which is loaded with compressive stress. If instead of subtracting the signal from an unloaded measuring body, this tension signal is subtracted, theoretically an improved sensitivity and improved linearity are obtained.

With the above-described concept, it has proved that those parts of the transducer for tension and/or compression, which are subjected to compression and bending moments, must be made extremely strong in order to provide, in reality, any significant tensile stress in the measuring zone. This makes the transducer both clumsy and expensive. In addition, the heavy stresses, because of bending in the transducer for tension and/ or compression, result in a very unevenly distributed stress around the magnetic circuit, which in turn leads to a deteriorated linearity of the measured signal.

U.S Pat. No. 2,867,118 entitled "Transducer and stress measuring means" describes a magnetoelastic transducer in which two measuring zones made of different materials are loaded to the same stress. One of the materials has positive magnetostriction and the other has negative magnetostriction and, as in other transducers, the difference between the magnetic fluxes in the respective measuring zone is measured.

This solution satisfies the requirement that the transducer shall be simple and inexpensive to manufacture. Since the zones are made of different materials, however, the requirement for good conformity between these cannot be fulfilled, which is a necessity in order to obtain good stability according to the above reasoning.

U.S. Pat. No. 4,802,368 describes a transducer for tension and/or compression comprising two identical transducer halves which are screwed together in the middle. In addition to what is mentioned in general terms above concerning transducers for tension and/or compression, the force transducer according to the last-mentioned US patent suffers from the additional disadvantage that both the magnetic field lines and the field of force lines are forced to pass over joints. Since all surfaces are uneven, seen microscopically, the magnetic field will experience different degrees of difficulty in passing the joint at different points of the surface, whereby the good rotational symmetry of the transducer with respect to the magnetic field configuration will be broken. This reduces the ability of the transducer to suppress lateral loads. In addition, the mechanical stresses arising in the transducer upon loading will be unevenly distributed over the joint, and sliding between the surfaces gives rise to hysteresis of the transducer signal.

SUMMARY OF THE INVENTION, ADVANTAGES

A magnetoelastic force transducer according to the invention comprises, according to known technique, two closed magnetic circuits which are magnetized by two series-connected primary windings. The transducer is built up in such a way that the reluctance in one magnetic circuit will be changed when the transducer is subjected to a force as a result of changes in the magnetic permeability caused by magnetostriction. This change in reluctance gives rise to a varying magnetic flux. The second magnetic circuit is designed so as to have an unchanged or essentially unchanged reluctance when the transducer is loaded and is used in a known manner to compensate for those changes of the permeability of the material which arise for reasons other than magnetostriction.

This compensation is brought about by subtracting that signal which is induced in the measuring winding which senses the flux in the force-independent part from that signal which is induced in the measuring winding which senses the flux which varies with the force. If the permeability and hence the magnetic flux are now changed, for example because of temperature changes, this change will give rise to equally large signal changes in both measuring windings. These changes will not, therefore, contribute to the output signal from the transducer.

In order for this compensation to function satisfactorily, it is necessary for both magnetic circuits to be as identical as possible, both as regards the magnetic material included, the geometrical embodiment and the magnetization, and for the magnetic circuits to be subjected to precisely the same external conditions, for example temperature.

The force transducer according to the invention is formed with a rotationally symmetrical structure since such a structure is easy to manufacture and is well suited for automatic production. A rotationally symmetrical body also gives low sensitivity to lateral forces and bending moments. The force transducer comprises a force-absorbing core provided with three flanges, one at the two ends of the core and one at the centre of the core. It is thus able to operate as a bobbin for the excitation and measuring windings. The flux closure yokes of the magnetic circuits consist of the mentioned flanges and an outer cylindrical shell. The force-absorbing core which is formed in one piece consists of a relatively thin-walled tubular force-dependent section and a thick-walled force-independent section. The thick-walled tubular section may be replaced by a solid cylindrical section. The transition between these will have a length equal to the thickness of the central flange. It is then important that this transition should be kept as short as possible to obtain a small dispersion of the force flux in the thick-walled section. The transition can be made with a conical shape or with a different contour. This part of the transducer will henceforth be referred to as a first transition zone.

The thick-walled tubular section has in its second end a second transition zone towards a terminating zone for the core having dimensions corresponding to the thin-walled, tubular section. However, practical tests have shown that it is only important that the outer diameter is reduced to the outer diameter of the thin-walled tube. Also this second transition zone is to be kept as short as possible and corresponds to the thickness of the associated outer flange.

As mentioned, to obtain a good compensation for those changes of the permeability of the material which have occurred for reasons other than magnetostriction, it is important for the magnetic materials included to be as identical as possible. The best identity is obtained by manufacturing the magnetic parts for the most part from one and the same piece. The other parts can be given a low reluctance and hence a small influence on the total reluctance. In this way, the best conformity is also obtained as regards temperature changes. Since the force-absorbing core is made in one piece, a structure without joints in the force flux is obtained. Completely eliminating joints in the magnetic flux path is impossible if the excitation and measuring windings of the transducer are to be capable of being wound in a simple manner.

The force-dependent magnetic circuit has been formed so as to consist partly of a loaded part, i.e. the thin-walled tubular section, where the stress configuration is as even as possible and free from stress concentrations, and partly of parts with very low load, comprising flanges and parts of the outer shell. In this way, the best linearity and resistance to overload are obtained.

To create the essentially force-independent magnetic circuit, the fact that the flux at high frequencies will be concentrated to the surface, because of eddy currents, has been made the starting-point. Therefore, the selection of the supply frequency also forms part of the invention. This frequency is selected such that the depth of penetration into the magnetoelastic material is smaller than the wall thickness of the thick-walled tubular section of the core. Consequently, only the stress in the surface of the thick-walled tubular section contributes to the reluctance. By forming this part of the core as described above, the force flux will for the most part pass in the central part of the thick-walled tubular section. In this way, the force flux can be "screened off" from the surface, thus obtaining a considerable reduction of the mechanical stresses in this part of the transducer. However, it should be pointed out that this "screening" does not apply to a possible temperature flux which is led in via the same contact points as the force, but this will influence the zones equally. In such a core design the two magnetic circuits will not be identical so there must be a certain amount of adjustment of the numbers of turns of the windings.

Within the scope of the invention there are also other embodiments of the core which provide a better identity between the magnetic circuits. However, to a certain extent this is at the expense of higher manufacturing costs and a more uneven mechanical stress distribution. Alternative core designs will be described in greater detail under the "Description of the preferred embodiments".

The transducer can be used in a simple manner also for measuring tensile force by applying the force via, for example, threaded joints at the ends of the transducer, or it can be used as part of an existing structure.

By allowing the described core to form an integral part of a rotating shaft, for example a drilling head, and winding excitation and measuring windings on an existing, stationary bobbin, being concentric with the shaft, a signal corresponding to a combination of compressive force and torque can be obtained during drilling.

DESCRIPTION OF THE PREFERRED EMBODIMENTS

Figure 1:
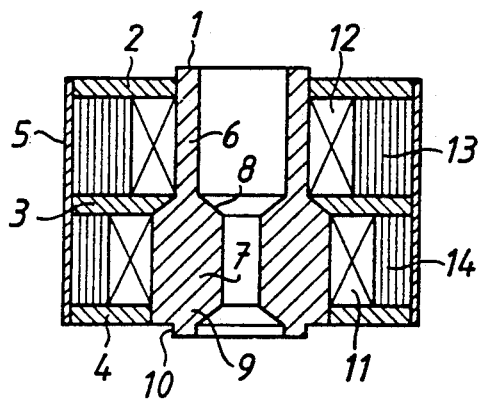
FIG. 1 shows a cross section of the rotationally symmetrical transducer with a force-absorbing core, essentially unloaded parts, which close the magnetic circuits, excitation windings and measuring windings.

A preferred embodiment of a magnetoelastic force transducer according to the invention is clear from FIG. 1 which shows an axial section through the shaft of the transducer. The transducer comprises two magnetic circuits and consists of a force-absorbing core 1, flux closure yokes in the form of a first 2, a second 3 and a third 4 flange as well as a sleeve 5. The flanges may constitute integral parts of the core 1, or they may be manufactured as separate parts which can either be welded or glued to the central part of the core 1. The surrounding sleeve 5 may be welded or alternatively glued to the flanges after the windings have been mounted. As previously described, the core 1 is formed as a thin-walled force-dependent tubular section 6 and a thick-walled force-independent tubular or solid section 7 with an intermediate first transition zone 8 having the same axial length as the thickness of the second flange 3. At the other end of the thick-walled or solid section 7 there is a second transition zone 9 with an axial length corresponding to the thickness of flange 4 The core 1 then terminates in a short zone 10 with the same outer diameter as the outer diameter of the thin-walled tubular section 6. The inner diameter of zone 10 can be selected optionally between the inner diameter of the thin-walled zone and the inner diameter of the thick-walled zone. Also when the force-independent section 7 is formed as a solid part, it is desirable with an embodiment of the lower part as the described transition zone 9. This leads to the creation of a first measuring zone consisting of the core part 6, the transition zone 8 and the flanges 2 and 3 and the upper part of the sleeve 5, and a second force-independent measuring zone consisting of the core part 7, the transition zones 8 and 9 and the flanges 3 and 4 and the lower part of the sleeve 5.

The core 1 and the flux closure yokes can suitably be made of high-permeability material to reduce the reluctance in these parts and raise the sensitivity. As mentioned, the flanges 2, 3 and 4 can also be manufactured directly from the same piece as the core 1. In the space between the flanges the excitation windings 11 and 12 as well as the measuring windings 13 and 14 have been wound. As will be clear, the core 1 operates as a suitable bobbin.

Figure 2:
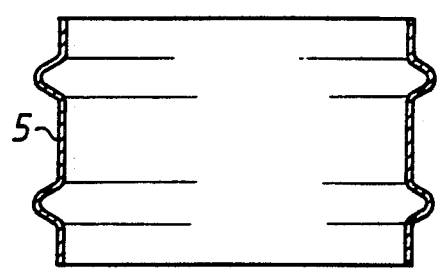
FIG. 2 shows an alternative way of designing part of the flux closure yokes to additionally reduce the shunt force and hence also the mechanical stresses therein.

To obtain low force shunting of the magnetic return conductors, the flanges 2, 3 and 4 should be made thin. In order to further reduce the mechanical stresses in this part, the sleeve 5 may be formed as a bellows according to FIG. 2.

Because of the larger cross section area of the thick-walled tubular section 7, the mean stress therein will be lower than in the cross section area of the thin-walled section 6. When the stress "flow lines" from the thin-walled section 6 penetrate into the thick-walled section 7, in accordance with Saint Venant's principle, the "flow lines" will diverge towards the envelope surface of the thick-walled or solid section 7, largely at an inclination of 45 degrees. Since this zone does not have sufficient axial length for the stress to be able to spread out into even distribution over the entire cross section, the stress will be weaker and the compressive stress lower at the envelope surface than at the centre. Because of the lower mean stress, the unevenly distributed compressive stress and the limited depth of penetration of the magnetic field due to the skin effect of the magnetization, the second measuring zone will therefore be essentially force-independent.

The inner and outer diameters, respectively, of the lower force-independent section should be selected such that compressive stresses in the upper part are constant both over the cross section and in the longitudinal direction of the core. This must then be done at the expense of the absolute geometrical identity between the circuits. However, this can be compensated for by adjustment of the numbers of turns of the excitation and measuring windings, respectively, so as to create as equal magnetic conditions as possible for the two magnetic circuits and so that the resultant output signal from the transducer in unloaded state becomes as near zero as possible.

The magnetization, the measurement of reluctance changes and the processing of measured values are performed in a manner conventional for this type of transducers. By connecting the secondary windings in opposition, a voltage is generated corresponding to the flux difference. This voltage is connected to a phase-sensitive rectifier which in turn is controlled by the phase of the supply signal generator. The high frequencies of the output signal are filtered off in a low-pass filter, thus obtaining a direct voltage proportional to the force which loads the transducer.

Figure 3:
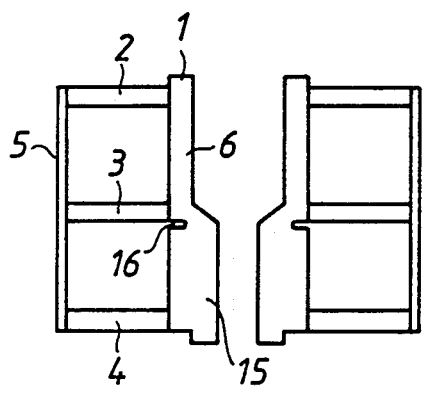
FIGS. 3 and 4 show alternative embodiments of the core, and FIG. 5 showns an embodiment of a transducer in which its core is separated from other parts in order to be able to perform axial force measurement in a contactless manner.

FIG. 3 shows an embodiment of the core 1 in which the thick-walled tubular section 7 has been replaced by a first tubular section 15 having largely the same inner diameter as the thick-walled tubular section and having largely the same outer diameter as the outer diameter of the thin-walled tubular section 6. This results in greater identity between the two magnetic circuits. By providing an external, narrow radial slot 16 at the transition between the thin-walled section and the tubular section 15, the force flux has been "screened off" from the second magnetic circuit. In this case, however, a certain bending of the force-measuring zone is obtained, with an ensuing more uneven stress distribution. In addition, the overload capacity is reduced because of stress concentrations at the bottom of the radial slot.

Figure 4:
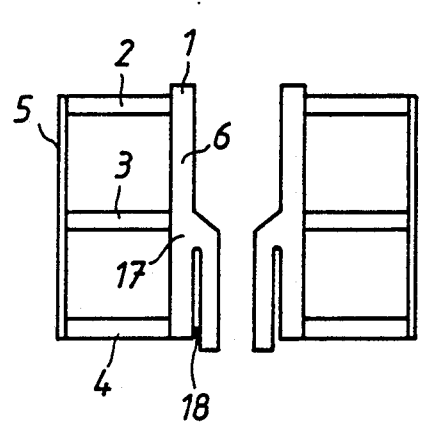

An embodiment of the core 1 with a full geometrical identity between the two magnetic circuits is shown in FIG. 4. This has been achieved by replacing the thick-walled tubular section 7 by a second tubular section 17 having largely the same inner diameter as the thick-walled tubular section 7 and having largely the same outer diameter as the outer diameter of the thin-walled tubular section 6. By providing a narrow axial slot 18 extending from the free end of the second tubular section 17, which slot has an outer diameter equal to the inner diameter of the thin-walled tubular section 6 and an axial length corresponding to the axial length of the lower zone, the surface of that zone has been freed from the force flux. However, this concept is more expensive to manufacture than the previous ones, and also in this case it is not possible to obtain a completely evenly distributed stress in the force-measuring section.

Also other similar embodiments of the core are covered by the invention.

Figure 5:
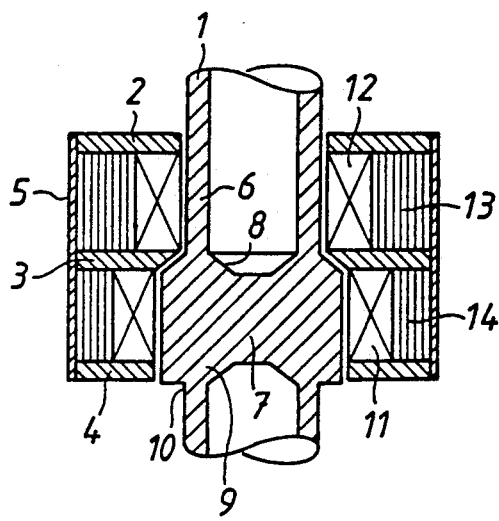

FIG. 5 shows an embodiment in which the core 1 forms an integral part of, for example, a rotatable drilling head. The force-independent section 7 is here shown as a solid part with the same transition zones 8 and 9 as previously mentioned. As will be clear, excitation and measuring windings are housed in an outer stationary bobbin having the same flanges 2, 3 and 4 and shell 5 as in the embodiments described above. Upon loading, the measured signal obtained will constitute a combination of the axial force and the torque to which the transducer section of the spindle is subjected.

We claim:

1. A magnetoelastic force transducer comprising a force-absorbing rotationally symmetrical core of magnetoelastic material provided with two excitation windings supplied with alternating current, two measuring windings, flux closure yokes in the form of a first, a second, and a third flange, and a surrounding sleeve, said core comprising:

a thin-walled tubular section and a thick-walled tubular or solid section with an intermediate first transition zone and a second transition zone located at the other end of the tick-walled tubular or solid section, said second zone changing into a short zone with the same outer diameter as the outer diameter of the thin-walled tubular section;

a first force-dependent magnetic circuit consisting of the thin-walled tubular section of the core, the first transition zone, the first and second flanges and that part of the sleeve which lies between these flanges and an excitation winding and a measuring winding;

a second force-independent magnetic circuit consisting of the thick-walled tubular or solid section of the core, the first and second transition zones, the second and the third flanges and the remaining part of the sleeve, and an excitation winding and a measuring winding;

the frequency of the supply voltage being chosen such that the penetration depth into the magnetoelastic material is much smaller than the wall thickness of the thick-walled tubular section and much smaller than the radius of the thick-walled section when this thick-walled section is formed as a solid part;

the numbers of turns of the excitation windings being adapted such that the magnetic conditions are the same in the two magnetic circuits;

the measuring windings being connected in opposition; and the numbers of turns of the measuring windings being adapted such that the output voltage of the transducer amounts to the desired level in the case of an unloaded transducer.

2. A magnetoelastic force transducer according to claim 1, wherein the flanges are manufactured from the same piece as the core.

3. A magnetoelastic force transducer according to claim 1, wherein the flanges are welded or glued to the core.

4. A magnetoelastic force transducer according to claim 1, wherein the sleeve is welded or glued to the flanges.

5. A magnetoelastic force transducer according to claim 1, wherein the sleeve is arranged as a bellows which is compressible to a certain extent in the axial direction.

6. A magnetoelastic force transducer according to claim 1, wherein the core is separated from flanges, sleeve and windings to make possible contactless axial force measurement of freestanding shafts.

7. A magnetoelastic force transducer comprising a force-absorbing rotationally symmetrical core of magnetoelastic material provided with two excitation windings supplied with alternating current, two measuring windings, flux closure yokes in the form of a first, a second, and a third flange, and a surrounding sleeve, said core comprising:

a thin-walled tubular section and a first tubular section having the same outer diameter as the thin-walled tubular section, said first tubular section including an external, narrow, radial slot at the transition between said thin-walled tubular section and said first tubular section;

a first force-dependent magnetic circuit including the thin-walled tubular section of the core, the first and second flanges and that part of the sleeve lying between the flanges and an excitation winding and a measuring winding;

a second force-independent magnetic circuit including the first tubular section, the second and third flanges and the remaining part of the sleeve, and an excitation winding and a measuring winding;

the frequency of the supply voltage being selected such that the penetration depth into the magnetoelastic material is much smaller than the wall thickness of the first tubular section;

the number of turns of the excitation windings being adapted such that the magnetic conditions are the same in the two magnetic circuits;

the measuring windings being connected in opposition; and the number of turns of the measuring windings being adapted such that the output voltage of the transducer amounts to the desired level in the case of an unloaded transducer.

8. A magnetoelastic force transducer comprising a force-absorbing rotationally symmetrical core of magnetoelastic material provided with two excitation windings supplied with alternating current, two measuring windings, flux closure yokes in the form of a first, a second and a third flange, and a surrounding sleeve, said core comprising:

a thin-walled tubular section and a second tubular section having the same outer diameter as said thin-walled tubular section, said second tubular section including a narrow axial slot extending from the free end of the second tubular section, said slot having an outer diameter equal to the inner diameter of said thin-walled tubular section and an axial length corresponding to the axial length of a lower zone;

a first force-dependent magnetic circuit including the thin-walled tubular section of the core, the first and second flanges and that part of the sleeve lying between the flanges and an excitation winding and a measuring winding;

a second force-independent magnetic circuit including the second tubular section, the second and third flanges and the remaining part of the sleeve, and an excitation winding and a measuring winding;

the frequency of the supply voltage being selected such that the penetration depth into the magnetoelastic material is much smaller than the wall thickness of the second tubular section;

the number of turns of the excitation windings being adapted such that the magnetic conditions are the same in the two;

the measuring windings being connected in opposition; and the number of turns of the measuring windings being adapted such that the output voltage of the transducer amounts to the desired level in the case of an unloaded transducer.

* * * * *